United States Patent
Newhouse et al.

(10) Patent No.: US 8,056,869 B2
(45) Date of Patent: Nov. 15, 2011

(54) STATIC AND DYNAMIC CABLE MANAGEMENT BRACKET

(75) Inventors: Todd A. Newhouse, Rohnert Park, CA (US); Richard F. Gianni, Healdsburg, CA (US); Joseph F. Kidd, Santa Rosa, CA (US)

(73) Assignee: Tellabs Petaluma, Inc., Naperville, IL (US)

( * ) Notice: Subject to any disclaimer, the term of this patent is extended or adjusted under 35 U.S.C. 154(b) by 984 days.

(21) Appl. No.: 11/858,543

(22) Filed: Sep. 20, 2007

(65) Prior Publication Data

US 2009/0078835 A1  Mar. 26, 2009

(51) Int. Cl.
*F16L 3/00* (2006.01)

(52) U.S. Cl. .................. 248/74.4; 248/316.8; 248/74.3; 248/73; 248/74.1

(58) Field of Classification Search .................. 248/49, 248/56, 62, 65, 68.1, 73, 74.1, 74.3, 74.4, 248/316.1, 316.7, 316.8
See application file for complete search history.

(56) References Cited

U.S. PATENT DOCUMENTS

| | | | | |
|---|---|---|---|---|
| 2,335,296 A * | 11/1943 | Miller | | 248/50 |
| 5,067,678 A | 11/1991 | Henneberger et al. | | 248/68.1 |
| 5,108,054 A * | 4/1992 | Degand | | 248/50 |
| 5,464,178 A * | 11/1995 | Grinwald et al. | | 248/50 |
| 5,503,353 A * | 4/1996 | Degand | | 248/50 |
| 5,884,372 A * | 3/1999 | Anscher et al. | | 24/339 |
| D427,897 S | 7/2000 | Johnston et al. | | D8/395 |
| D428,330 S | 7/2000 | Johnston et al. | | D8/395 |
| 6,504,100 B2 * | 1/2003 | Lawrence et al. | | 174/100 |
| 6,584,267 B1 | 6/2003 | Caveney et al. | | 385/134 |
| 6,613,981 B1 | 9/2003 | Hathcock et al. | | 174/69 |
| 6,614,981 B2 | 9/2003 | Zdinak et al. | | 385/136 |
| 6,892,020 B2 | 5/2005 | Douglas et al. | | 385/136 |
| 7,089,710 B2 * | 8/2006 | Nicholson | | 52/698 |
| 7,699,277 B2 * | 4/2010 | Bagnall | | 248/206.5 |

* cited by examiner

*Primary Examiner* — Terrell McKinnon
*Assistant Examiner* — Steven Marsh
(74) *Attorney, Agent, or Firm* — Fitzpatrick, Cella, Harper & Scinto

(57) ABSTRACT

A bracket is provided having a spacer connected to a first and second arms. The spacer has a proximate end and a distal end disposed apart from each other at a suitable distance. The first arm has a base end and a free end, the base end being connected to a first side of the proximate end of the spacer and the free end extending from the proximate end. The second arm has a base end and a free end, the base end connected to the proximate end, and the free arm extending from the proximate end. The first arm, the second arm, and the proximate end substantially form a ring having a gap between the free ends of the first and second arms. Another bracket is provided having a hook and a ring connected to a top of the hook, wherein the ring includes a gap formed therein.

20 Claims, 4 Drawing Sheets

STATIC AND DYNAMIC CABLE MANAGEMENT BRACKET

BACKGROUND

Field

The present invention relates generally to the field of wire management systems and more particularly to the field of dynamic and static cable management supports.

Electronic equipment can be designed to be arranged within standard sized racks, that typically include first and second vertical supports that are separated by an opening. The opening widths of racks tend to be standard sized, as adopted by industry, manufacturers, and/or governments. In the United States, for example, telephone companies may use racks having opening widths of 23 inches, whereas telephone companies in European countries may use racks having opening widths of 19 inches.

Rack mountable electronic equipment may take the form of modular electronic equipment. Often, modular electronic equipment is installed into a chassis and the chassis is then mounted within the opening of a rack. In the case of modular communication equipment, a chassis may house optical electronic equipment such as transmitters, receivers, intelligent control interface modules, power supplies, and the like. A chassis may also house cooling fans or other cooling mechanisms to aid in controlling the operating temperature of the equipment modules.

In a typical scenario, an electronic equipment module (hereinafter referred to as "a module") slides into a slot (or slots) in the chassis and connects at one end to a chassis backplane that has mating communication connectors to receive the module. Cables may route to and through the chassis, and the chassis may include a cable management feature. Once the modules are installed into the slots they are typically wired to other electronic modules that may or may not be located within the same rack. Often, chassis are stacked vertically on top of one another and cables connected to modules in upper chassis are routed towards the ground and draped over similar wiring of chassis placed in the lower portions of the rack.

This draping or layering of the cables from an upper chassis over the lower cables adds to the strain on the upper cables due to the increased weight of the additional length of cable. Existing cable management solutions bundle cables together for organization, but, as noted by the present inventors, do not do anything to the bend radius. Gravity forces acting on the cables terminating in upper chassis acts along a moment arm due to the connector configuration at the termination location of the cable. This force creates a torque at the cable near the connector and a resulting deflection (bend in the cable). In this state the cable bends to balance the torque and in the process the upper portion of the cross section of the cable sees a tensile stress while the lower portion sees a compressive stress. For fiber optic cables, that have a larger minimum bend radius than traditional wire cables, as the force increases the bend radius will decrease until a minimum bend radius exists, at which point additional force will cause the cable to break, as a brittle failure. In addition to the weight of the hanging cable, additional forces can be applied on the cable from the weight of cables draped over the cable, thereby exacerbating the problem.

In addition, many chassis cable management devices route cables vertically in bundles in front of the module. In some cases the bundles of cables pass through cable rings that are in a "U" shape pattern with each end of the "U" simply attached to the front face of the module. With this arrangement, the entire area enclosed between the cable ring and the front face of the module is available to route cable. Further, because no support is given to the bundle of cables, all of the weight of the cable is transferred to the cable connector. In addition to this large force, a large torque is also applied at the upper end of the cable, bending the cable relatively sharply and putting still greater stress on the cable.

In addition to the physical effect on the cable itself the resulting arrangement of cables due to the "U"-shaped rings also create servicing difficulties. Since the "U"-shaped rings are rigid and are densely populated with cable, it may be difficult to service components in the chassis because individual bundles in front of the component cannot be moved out of the way to provide access for a technician. In addition, because the bundle of cables are kept close to the face of the module, servicing modules beneath a vertical bundle is difficult because little clearance, if any, is left, for example, to slide a module out from the front of a chassis.

SUMMARY

According to a first aspect of the invention a bracket is provided having a spacer connected to a first and second arms. The spacer has a proximate end and a distal end disposed apart from each other at a suitable distance. The first arm has a base end and a free end, the base end being connected to a first side of the proximate end of the spacer and the free end extending from the proximate end. Similar to the first arm, the second arm has a base end and a free end, the base end connected to the proximate end, and the free arm extending from the proximate end. The first arm, the second arm, and the proximate end substantially form a ring having a gap formed in the ring between the free ends of the first and second arms.

The first and second arms may be perpendicular to a surface comprising the proximate end of the spacer. Additionally, the first and second arms may each have at least a portion that is flexible. The arms may be coplanar, and they may have sufficient flexibility to permit the free ends of the first and second arms to be displaced relative to each other to enlarge the gap. The free ends of the arms may also each have a diagonal surface forming the gap between these diagonal surfaces. In addition the distal end of the base may be configured to be mounted to a mounting surface, such as an electronic component rack.

The base of the bracket may be shaped to slide into a slot formed in a housing that the bracket to which the bracket may be pivotally connected. This housing may also have mounting features so that the housing can be fastened to a mounting surface such as an electronic component rack.

According to a second aspect of the invention a bracket is provided having at least one hook and at least one ring connected to a top of the hook, wherein the ring includes a gap formed therein.

The hook may be configured to be fastened to a surface, such as an electronic component rack. The ring may be disposed substantially horizontally and the hook may disposed substantially vertically. The hook may include a substantially vertical planar rear side member connected to the ring, a substantially horizontal planar bottom member connected to the rear side member, and a substantially vertical planar front side member connected to the bottom member. The front side member includes a free end disposed towards the ring gap, creating a space between the front side and the ring gap. This space may be at least as large as the width of a cable that will be supported by the bracket. In addition the front and bottom sides, and the rear and bottom sides of the hook are arranged perpendicular to one another. The gap may also be formed by diagonal surfaces on both sides of the gap.

DETAILED DESCRIPTION

Figure 1:
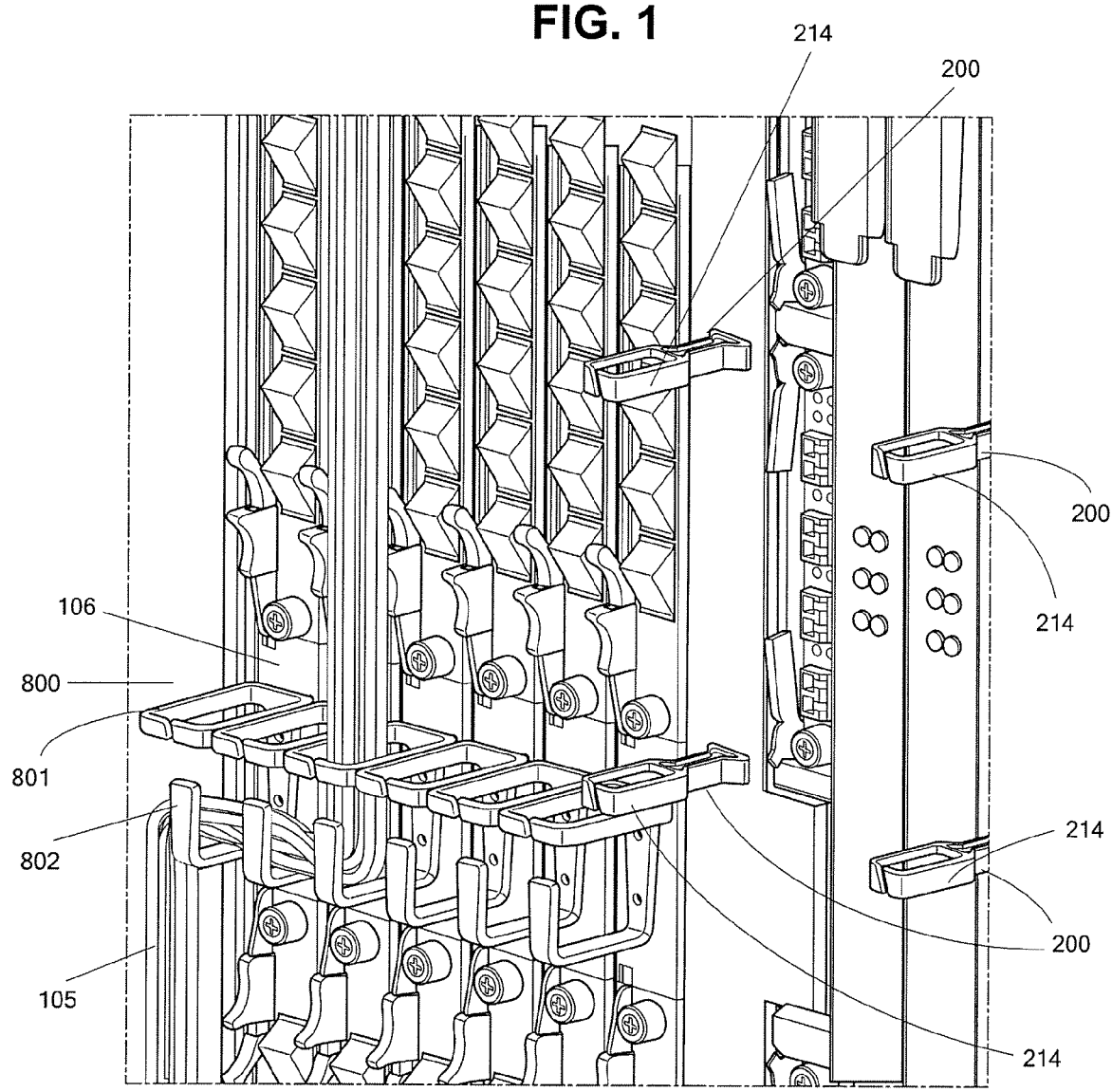
FIG. 1 shows examples of brackets mounted to a supporting structure in accordance with an example embodiment of the present invention.
Figure 2:
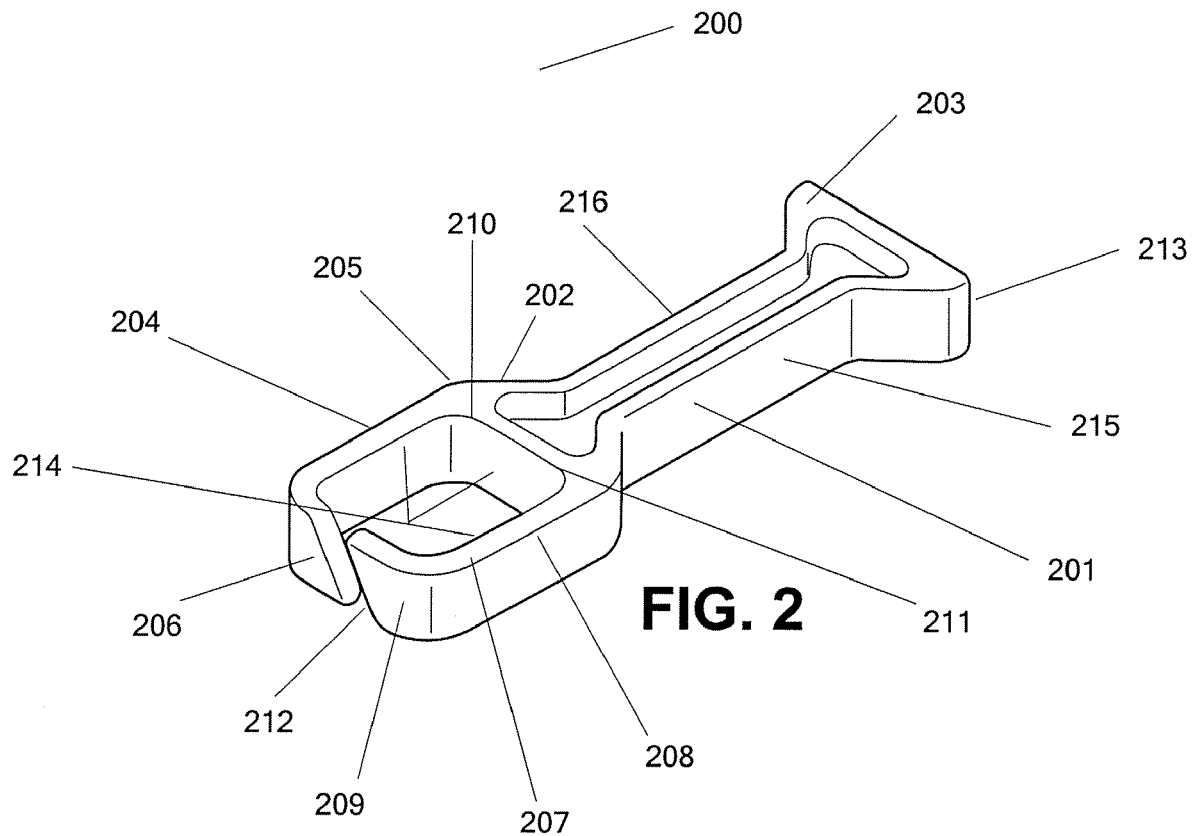
FIG. 2 shows an example of a bracket in accordance with an example embodiment of the present invention.

One example embodiment of a first aspect of the invention, shown in use in FIG. 1, and in more detail in FIG. 2, is a bracket 200 comprising a spacer 201 having a proximate end 202 and a distal end 203 disposed apart from each other a suitable distance, from which a first arm 204 and a second arm 207 extend parallel to each other. The first arm 204 has a base end 205 and a free end 206, the base end connected to a first side 210 of the proximate end 202 of the spacer and the free end 206 extending from the proximate end 202. Finally, second arm 207 has a base end 208 and a free end 209, the base end 208 connected to the proximate end 202, and the free end 209 extending from the proximate end 202. The first arm 204, the second arm 207, and the proximate end 202 substantially form a ring 214 in which a gap 212 is formed between the respective free ends 206 and 209 of the first arm 204 and the second arm 207.

In their neutral position (shown in FIG. 2) the free ends 206 and 209 of the ring 214 are substantially aligned and are suitably close together so as to prevent cables from entering or exiting the ring 214. In the example embodiment shown in FIG. 2, the gap 212 between free ends 206 and 209 of the arms is oriented along a diagonal. This helps prevent articles retained within the ring 214 from unintentionally being released from the ring 214. At least a portion of each arm 204, 207 is flexible so that the free ends 206 and 209 can be deflected relative to each other by applying a force to one or both of the arms to separate the arms, such as, for example, by introducing an object into the gap 212, such as, for example, a cable. For example, an upward force can be applied to one of the arms 206 or 209 to move it vertically upward and away from the other arm 206 or 209. When the ends of the arms are displaced relative to each other the gap 212 will adjust allowing objects such as cables to be moved through the gap 212 for insertion or removal. Upon release of the force on the arms 206, 209, they will return to their neutral position, shown in FIG. 2.

In one example embodiment of the bracket 200 at least one mounting feature may be present on the distal end 213 of the spacer 201. For example, in the example embodiment shown in FIG. 2 the bracket 200 has a mounting surface 213 for mounting to, for example, a rack or other electronic component. The mounting feature may include a threaded fastener (not shown) and may also include a molded mounting feature (not shown) that is present on the distal end 203 of the spacer 201 for insertion into a corresponding receiving mounting feature on or in the electronic component. As one example, the electronics component may include an integral snap-fit mounting feature to receive a corresponding mating feature located on the mounting surface, which when snapped together, affixes the bracket to the mounting surface. Of course it will be appreciated that other fasteners and methods may be used to mount the bracket and are within the scope of the invention, including mechanical, chemical, electrical, and magnetic methods.

In use, as shown in FIG. 1, a plurality of brackets 200 are mounted on a structure, such as, for example, a modular component chassis 106. When multiple brackets 200 are used they are preferably mounted in line with one another so that the rings 214 of each bracket are aligned with each other so that a bundle of cables running through the rings 214 will be disposed in the same direction.

The spacer portion of the bracket 201 may be substantially hollow or solid. For example, to reduce the amount of material used in forming the ring or to achieve a certain cross-sectional area for structural purposes, the face of the distal 203 and proximate 202 ends of the spacer 201 may be connected by two sides 215 and 216, forming a wire-framed embodiment (not shown) to position certain objects, such as cables, a certain minimum distance away from the distal end 203 of the spacer 201.

Figure 3:
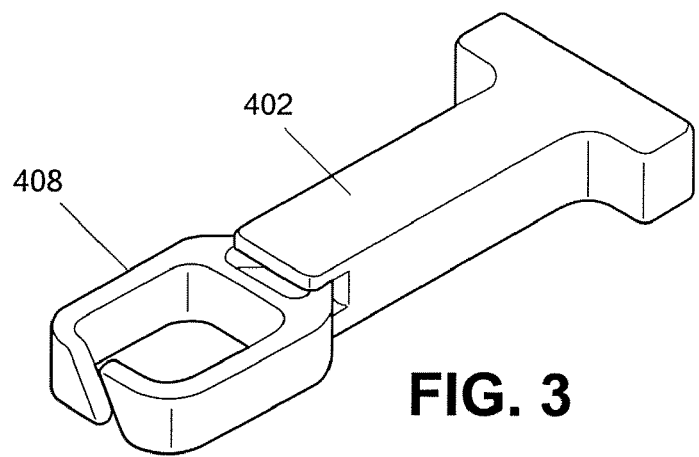
FIG. 3 shows an example of a bracket in accordance with another example embodiment of the present invention.
Figure 4:
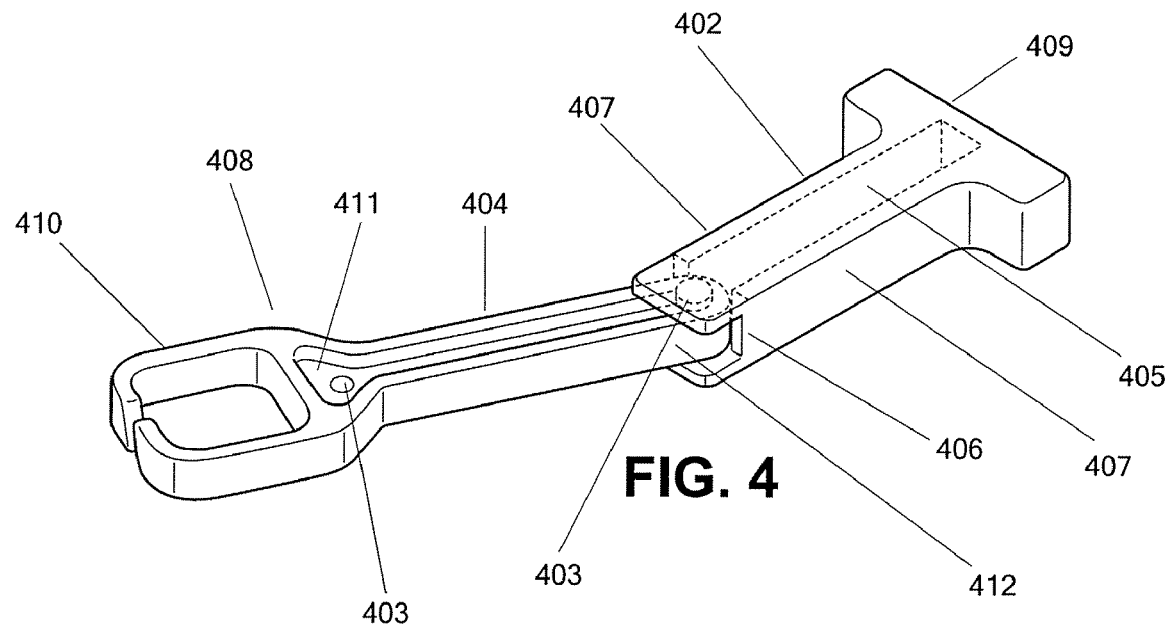
FIG. 4 shows the example of FIG. 3 in an extended position.

In another example embodiment, shown in FIGS. 3 and 4, the mounting feature of the structure shown in FIG. 2 is modified for rotational and translational attachment to a housing 402. FIG. 3 shows the resulting structure in a retracted position, while the structure is shown in an extended and rotated position in FIG. 4. Elements described with respect to FIG. 4 also correspond to elements that are part of the structure in FIG. 3, but which have not been shown for clarification purposes.

In the example embodiment shown in FIG. 4 the housing 402 comprises an inner hollow central slot 405 that receives the spacer 404. The slot 405 includes at least one retaining feature 403, such as an indent or detent, to prevent the spacer from separating from the housing during translation and rotation.

Figure 5:
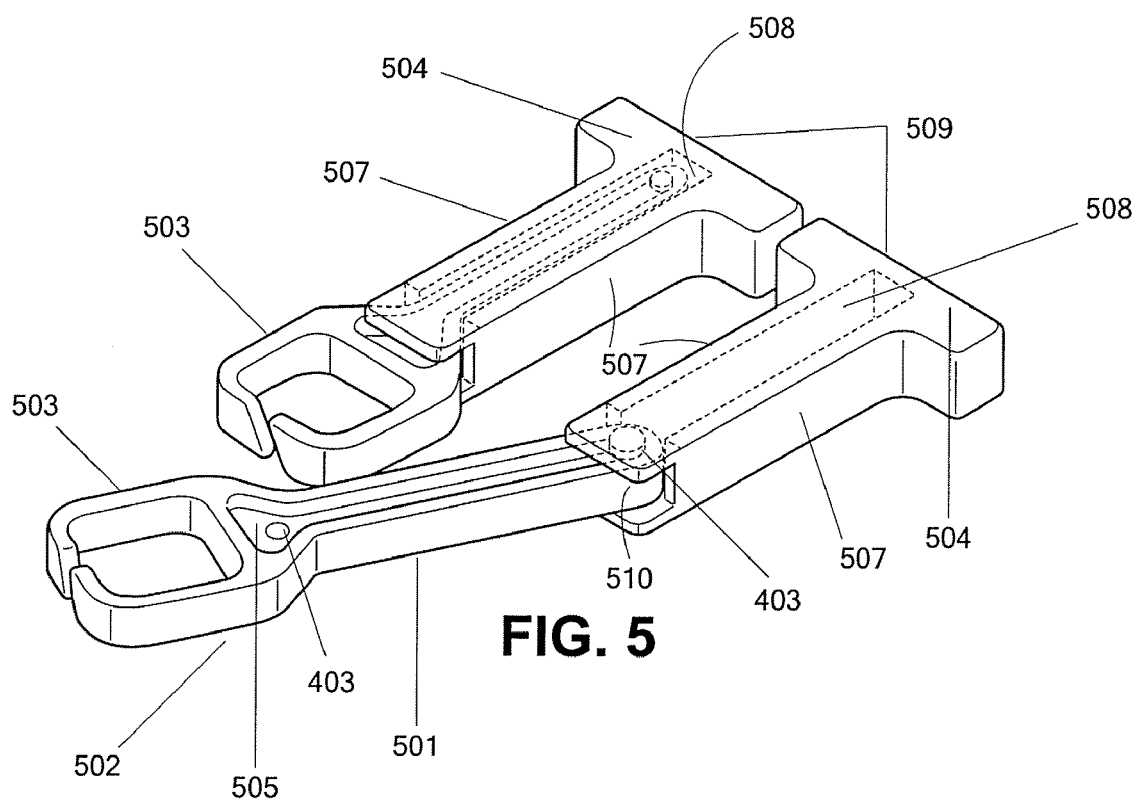
FIG. 5 shows a plurality of brackets used in conjunction in accordance with the another example embodiment of the present invention.
Figure 6:
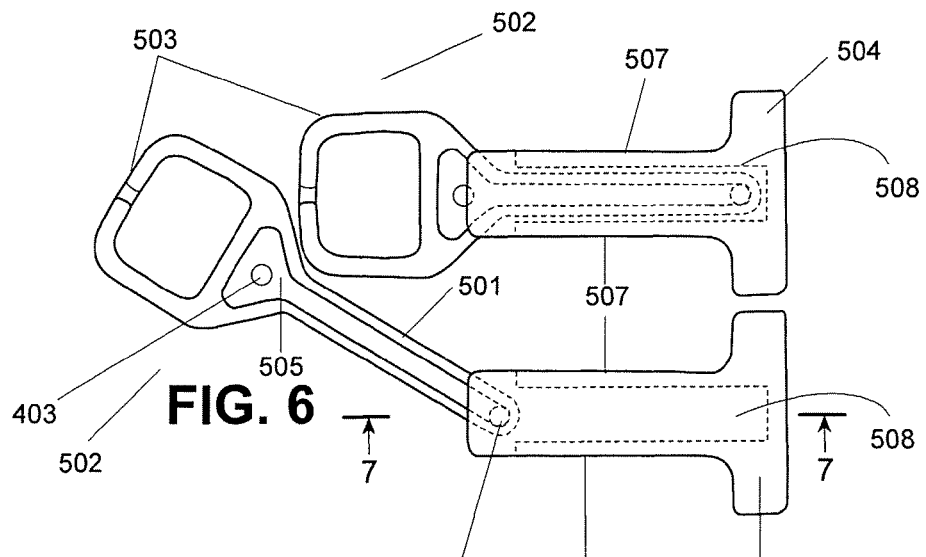
FIG. 6 shows a plan view of the plurality of brackets shown in FIG. 5.

The housing 402 of the example embodiment shown in FIG. 4 includes a notch 406 on the sides 407 of the housing 402 to allow the bracket to pivot when the bracket 408 is in a substantially extended position, as is shown in FIGS. 4-6. When the bracket 408 is pulled outward from the housing 402, 504 the articulating guide features of the spacer 404, 501 and the housing slot 405, 508 allow the bracket 408, 502 to translate outwardly away from the base 409, 509 of the housing 402, 504. When a pivot feature 403 near the distal end 412, 510 of the spacer 404, 501 is near the front of the housing 402, 504 the bracket 408, 502 can be pivoted in a direction transverse to the direction of travel from the base of the housing 409, 509 to the front of the housing.

As shown in the extended position in FIGS. 4-6, by virtue of the features of the bracket 408, 502 and the housing 402, 504 the bracket 408, 502 can both translate and rotate while still partially retained in the housing slot 405, 508.

In another example embodiment, shown in FIG. 5, the length of the spacer 501 and the shape of the ring 503 are configured such that when the bracket 502 is extended and rotated, at least a portion of the ring 503 extends out in front of the ring of the adjacent bracket that is in its retracted position. Also, the length of the spacer 501 is configured to be minimized consistent with its function in order to conserve space and avoid the ring 503 coming into contact with other objects or personnel in the vicinity of the bracket 502. By virtue of these features the bend radius of cables running within the ring 503 can be maintained larger than the minimum bend radius while the bracket 502 is in both its retracted and extended positions, and cable can be moved completely out of the way of a component located behind the cables when the bracket 502 is retracted. One will appreciate that temporarily displacing the cables by extending and rotating the bracket facilitates access to serviceable components behind the cable. This allows for quick access to the area behind the cables without removing them from the ring and without risking damage to the cables in the process.

The bracket 502 and housing 504 shown in FIG. 5 are illustrated in plan view in FIG. 6. In the extended position the bracket 502 has an angular range of motion within a plane transverse to the slot 508 direction about the pivotal connection 403 between the bracket 502 and the housing 504, so that when the bracket is disposed toward one or the other sides 507 of the housing 504 any cables running through the ring 503 will be displaced in the same direction away from the neutral location. The bracket 408, 502 can be rotated and translated back into the housing slot 405, 508.

Figure 7:
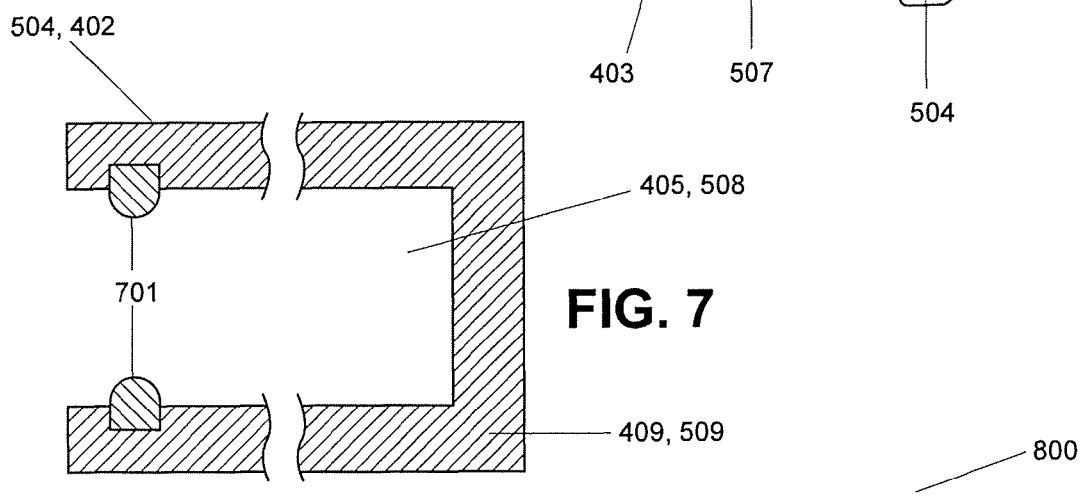
FIG. 7 shows a cutaway view of the section shown in FIG. 6

In another example embodiment, shown in FIG. 7, the housing 701 also includes a locking feature to keep the bracket 408, 502 in the retracted or extended positions so that a locking force must be overcome to change positions. For example, the bracket 408, 502 may include a recessed surface 411 or 505 along at least one side of the spacer 404, 501 to articulate with a corresponding mating feature, such as a detent 701 shown in FIG. 7, located in the path of the slot 405, 508 of the housing 402, 504, which will suitably retain the bracket 408, 502 in a retracted or extended position unless a pulling or pushing force is applied in a direction of the slot 405, 508 to displace the mating features of the slot. The recesses 411 and 505 may also include indents 403 or detents (not shown) at the proximate and distal ends of the spacer 404, 501 to articulate with corresponding detents 701 or indents (not shown) of the housing 402, 504. These additional features 403 and 701 facilitate locking the bracket 408, 502 in the retracted and extended positions. The bracket 408, 502 includes corresponding recesses 411 and 505 along the top and bottom (not shown) surfaces of the spacer 404, 501 to articulate with the retaining feature 701 of the housing 402, 504.

In FIG. 7 the housing 504, 402 includes two inward facing detents 701 located near the front end of the housing wherein the detents 701 are both in the path of the slot 405, 508. The surface of the detents 701 may include a hemispherical, cylindrical, or other suitable configuration. The portion of the recess 411, 505 at the distal end of the spacer may contains at least one indent 403 to engage and articulate with at least one detent 701 of the housing 402, 504 upon release of the spring force created by spreading the detents 701 apart by extending the bracket 408, 502 from the retracted position. When the detent 701 is engaged with the indent 403 located at the distal end of the spacer 501, 404, the bracket 408, 502 can be rotated transverse to the direction of translation.

By virtue of the detent 701 and the corresponding indents 403, the bracket 408, 502 and housing 402, 504 may be assembled as a snap fit assembly by positioning the distal end 412, 510 of the spacer 404, 501 towards the detents 701 of the housing slot 405, 508 and pushing the bracket 408, 502 towards the base of the housing 409, 509 so as to spread the detents 701 apart and translate the distal end 412, 510 of the spacer 404, 501 into the housing slot 504, 402 between the detents 701 and the base of the housing 409, 509.

Figure 8:
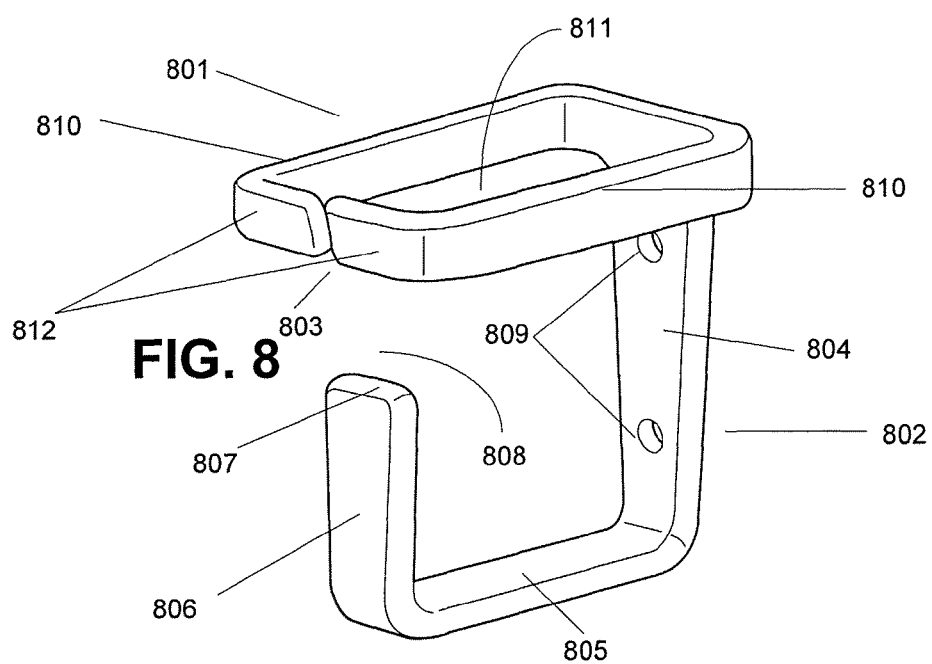
FIG. 8 shows an example of a bracket in accordance with another example embodiment of the present invention.

In another aspect of the invention, shown in FIG. 8, a bracket 800 has at least one hook 802 and at least one ring 801 connected to a top of the hook, with a gap 803 in the ring 801. The plane of the ring 801 may be substantially horizontal, and that of the hook 802, substantially vertical, so that the ring 801 is thus perpendicular to the hook 802.

In the example embodiment shown in FIG. 8 the hook 802 is comprised of a substantially vertical planar rear side member 804 that is connected to a substantially horizontal planar bottom member 805, which is connected to a substantially vertical planar front side member 806, such that the hook resembles a "J"-shape. In this example embodiment the rear side 804 and the bottom side 805, and the front side 806 and bottom side 805 are configured to be connected at substantially right angles. In this example embodiment the front side 806 contains a free end 807 that is disposed upwardly towards the ring gap 803, creating a space 808 between the free end 807 and the ring gap 803 that is at least as large as the width of a cable that will be supported by the bracket 800. The length and width of the front 806 and bottom 805 sides are configured to facilitate simultaneous insertion of a cable between the ring gap 803 and the space 808, so that, for example, a cable installer could insert or remove a cable from the bracket 800 with a single motion.

The rear side member 804 includes mounting features 809, such as, for example, holes. In the example embodiment of the bracket shown in FIG. 1, the bracket 800 may be fastened to a support structure 106, such as, for example, a portion of an electronic component chassis, such that the hook 802 is disposed substantially vertically and the ring 801 is disposed substantially horizontally.

The shape of the ring 801 shown in FIG. 8 is substantially a square or rectangular shaped ring including a gap 803. On either side of the gap 803 are two "C"-shaped portions 810 of the ring 801 that encompass an area that is used in the example embodiment of FIG. 1 to direct cable 105. In another example embodiment of the hook (not shown), when viewed from the top of the bracket 801, no part of the hook 802 extends forward beyond any part of the ring 801. In addition, the area 811 within the ring 801 is configured to be at least as large as the area formed between the sides of the hook. As a result, even the maximum number of cables supported by the hook 802 will fit through the ring 801 attached to the hook.

In one example embodiment of a bracket, the ring is configured to have a width that is no larger than the width of a component module over which cables run, which are routed by the bracket. For example, in the example embodiment shown in FIG. 1 the width of the ring 801 is within the width of the module above it.

The bracket 800 may be constructed from materials including rubber, plastic, metal, or may be constructed of other suitable material, such that when no forces are applied separating or otherwise displacing the portions 810 of the ring 801 on either side of the gap 803, those portions will be disposed in a neutral position (as is shown in FIG. 8) wherein those portions are co-planar, such as described with respect to the arms of an embodiment of the first aspect of the invention shown in FIGS. 2-6. The ring 801 and the hook 802 of the bracket 800 may be made from the same or different materials. The hook 802 is made of a suitable material to provide structural support against deflection forces applied by objects, such as cables, disposed over the hook. Furthermore, the hook 802 can be configured to include additional structural elements, including, but not limited to, ribs, tapers, channels, grooves, and gussets to reinforce the hook and prevent deflection when certain holding loads are applied, such as, for example, when holding heavier or larger bundles of cables.

While the example embodiment of the bracket shown in FIG. 8 includes a hook comprised of planar sides, in other embodiments the hook could be configured without planar sides, such as by using a curved bottom side and curved vertical sides. Also, the sides of the hook are configured to encompass an area that is suitable for carrying one or more cables across the hook, and the bottom side extends from the rear side a distance that is at least the total cross sectional distance of the cable or cables supported by the hook.

In one example embodiment, such as that shown in FIG. 8, the hook 802 and ring 801 are disposed substantially perpendicular to each other, however one of skill in the art will appreciate that other embodiments are possible where the hook and the ring may be disposed at different angles with respect to each other. By virtue of the second aspect of the invention the hook can be used, for example, to support the weight of one or more cables while the ring directs the cable at a suitable angle.

At least one cable can be introduced through the ring gap 803 either for removal or installation of a cable. Each free end of the ring 812 on either side of the gap 803 can be deflected relative to each other so as to adjust the size of the gap 803 during the introduction of a cable or other object. Further, each of the free ends of the ring 812 that are adjacent to each other may adjoin along a diagonal surface. The diagonal surface is configured, at least in part, to prevent vertically disposed cables running through the ring from unintentionally being pushed out of an otherwise vertical gap.

In one example embodiment a plurality of brackets are mounted next to each other on the surface of a chassis 106, wherein the ring is disposed horizontally and the hook is disposed vertically, as is shown in FIG. 1. When a plurality of such modules are mounted together in a chassis and adjoin, the resulting plurality of hooks 802 align with one another substantially forming a horizontal shelf or tray upon which to support a holding load distributed across the hooks. In the embodiment shown in FIG. 1 the three left brackets distribute the weight of the cables laying across the respective three hooks.

Instead of routing cable from the module to the bottom of a chassis rack, in the embodiment shown in FIG. 1, cables 105 may be routed vertically along a side of the chassis to a position of the hook 802 and routed horizontally across and over one or more hooks 802 and then up through one or more rings 801. The horizontal jog in the cable 105 provides strain relief near the cable connector by reducing the portion of weight of the cable 105 that is supported by the connector itself. With less weight supported at the connector, a larger bend radius can be maintained near the area of connection.

The bracket of this invention avoids also the previously described limitation of layering bundles of cable over and on top of other cables terminating on other chassis in a rack. In effect, the hook of the bracket provides a path for routing cables to one or more sides of the chassis rack and routing the cable to the chassis along the sides of the rack to the bracket, substantially at the height of the bracket. By relocating cable to the sides of the rack instead of over and in front of other chassis, much of the layering of cables can be avoided, resulting in easier access to serviceable components within the chassis of the rack.

Supporting a portion of the cable weight by the hook is also useful because less stress is placed on the cable near the termination location and a larger bend radius can be maintained. As mentioned above, this is especially important in the case of fiber optic cable and connectors where the cable itself is frangible when excessively tight bends and stress exist in the cable. By reducing the weight of the cable below the connector, the minimum bend radius of the cable can be maintained.

While the invention has been particularly shown and described with respect to example embodiments thereof, it will be understood by those skilled in the art that changes in form and details may be made therein without departing from the scope and spirit of the invention.

What is claimed is:

1. A bracket comprising:
 a spacer having a proximate end and a distal end disposed apart from each other at a suitable distance;
 a first arm having a base end and a free end, the base end connected to a first side of the proximate end of the spacer and the free end extending from the proximate end;
 a second arm having a base end and a free end, the base end connected to the proximate end, and the free end extending from the proximate end; and
 a housing having a slot formed, and pivotally connected to the distal end of the spacer,
 wherein the first arm, the second arm, and the proximate end substantially form a ring having a gap formed in the ring between the free ends of the first and second arms, and
 wherein the spacer is shaped to slide in the slot.

2. The bracket of claim 1, wherein the housing is configured to be fastened to a mounting surface.

3. The bracket of claim 1, wherein the spacer, the first arm, and the second arm are substantially coplanar.

4. The bracket of claim 1, wherein the first and second arms are perpendicular to a surface comprising the proximate end of the spacer.

5. The bracket of claim 1, wherein the free ends of the first and second arms each have a respective diagonal surface, and a gap is formed by the respective diagonal surfaces of the first and second arms.

6. The bracket of claim 1, wherein the first and second arms each have at least a portion that is flexible.

7. The bracket of claim 6, wherein the first and second arms have sufficient flexibility to permit the free ends of the first and second arms to be displaced relative to each other to enlarge the gap.

8. The bracket of claim 1, wherein the ring is a cincturing member.

9. The bracket according to claim 8, wherein the cincturing member surrounds an opening that is substantially rectangular or square shaped.

10. The bracket according to claim 1, wherein the housing includes a retaining member constructed to engage the spacer to retain the spacer in a first retracted position and is constructed to disengage the spacer when the spacer is not in the first retracted position.

11. A bracket comprising:
 an elongated spacer member;
 a cincturing member attached to an end of the elongated spacer member, and
 a housing, the housing defining a slot that is constructed to receive the elongated spacer member,
 wherein the cincturing member is coplanar with the elongated spacer member,
 wherein the cincturing member includes a gap forming a pair of flexible arms having free ends,
 wherein the housing includes a retaining member constructed to engage the elongated spacer member to retain the elongated spacer member in a first retracted position and is constructed to disengage the elongated spacer member when the elongated spacer member is not in the first retracted position, wherein the retaining member is a pivot member constructed to engage the elongated spacer member and retain the elongated spacer member at a second position and also constructed to permit the elongated spacer member to pivot about the pivot member at the second position, and wherein the second position is different from the first retracted position.

12. The bracket according to claim 11, wherein the housing is constructed to permit the elongated spacer member to translate and rotate while at least partially retained in the slot.

13. The bracket according to claim 11, wherein the elongated spacer member is constructed to pivot in a plane parallel to the housing.

14. The bracket according to claim 10, wherein the retaining member of the housing includes at least one of a detent and an indent formed in the slot of the housing.

15. The bracket according to claim 14, wherein the spacer includes at least one mating indent and detent corresponding to the at least one detent and indent formed in the slot of the housing.

16. The bracket according to claim 10, wherein the retaining member of the housing includes at least one detent and the spacer includes a first indent and a second indent which are constructed to mate with the detent, wherein the first indent mates with the detent when the spacer is in the first retracted position and the second indent mates with the detent when the spacer is in a second extended position.

17. The bracket according to claim 16, wherein the first indent is proximate to the proximate end of the spacer and wherein the second indent is proximate to the distal end of the spacer.

18. The bracket according to claim 11, wherein the pivot member includes at least one of a detent and an indent formed in the slot of the housing.

19. The bracket according to claim 18, wherein the elongated spacer member includes at least one mating indent and detent corresponding to the at least one detent and indent formed in the slot of the housing.

20. The bracket according to claim 11, wherein the pivot member includes at least one detent and the spacer includes a first indent and a second indent which are constructed to mate with the detent, wherein the first indent mates with the detent when the elongated spacer member is in the first retracted position and the second indent mates with the detent when the elongated spacer member is in the second position.

* * * * *